(12) United States Patent
Horiguchi et al.

(10) Patent No.: US 9,038,512 B2
(45) Date of Patent: May 26, 2015

(54) METHOD FOR MANUFACTURING BANDSAW BLADE, AND BANDSAW BLADE

(75) Inventors: Katsuhiro Horiguchi, Kanagawa (JP); Susumu Tsujimoto, Kanagawa (JP)

(73) Assignees: AMANDA COMPANY, LIMITED, Kanagawa (JP); AMANDA MACHINE TOOLS CO., LTD, Kanagawa (JP)

( * ) Notice: Subject to any disclaimer, the term of this patent is extended or adjusted under 35 U.S.C. 154(b) by 305 days.

(21) Appl. No.: 13/814,520

(22) PCT Filed: Aug. 5, 2011

(86) PCT No.: PCT/JP2011/067929
§ 371 (c)(1),
(2), (4) Date: Feb. 6, 2013

(87) PCT Pub. No.: WO2012/020702
PCT Pub. Date: Feb. 16, 2012

(65) Prior Publication Data
US 2013/0133500 A1    May 30, 2013

(30) Foreign Application Priority Data

Aug. 10, 2010 (JP) ................................ 2010-179308

(51) Int. Cl.
| | | |
|---|---|---|
| B23D 65/00 | (2006.01) | |
| B23D 63/20 | (2006.01) | |
| B23D 61/14 | (2006.01) | |
| B23D 61/12 | (2006.01) | |

(52) U.S. Cl.
CPC .............. *B23D 65/00* (2013.01); *B23D 61/125* (2013.01); *B23D 61/121* (2013.01); *B23D 63/20* (2013.01); *B23D 61/14* (2013.01); *B23D 63/201* (2013.01)

(58) Field of Classification Search
CPC ...... B23D 63/201; B23D 61/14; B23D 63/20; B23D 61/121; B23D 61/125; B23D 65/00–65/04
USPC ............. 83/13, 661, 830–832, 855, 835–845; 76/50.2
See application file for complete search history.

(56) References Cited

U.S. PATENT DOCUMENTS

| | | | | | |
|---|---|---|---|---|---|
| 2,336,030 | A | * | 12/1943 | Olson ............................. | 83/661 |
| 2,535,714 | A | * | 12/1950 | Anderson et al. ............... | 83/661 |
| 2,637,355 | A | * | 5/1953 | Chapin ........................... | 83/850 |
| 3,110,952 | A | * | 11/1963 | Anderson ....................... | 83/661 |
| 3,213,910 | A | * | 10/1965 | Sweet ............................. | 83/661 |

(Continued)

FOREIGN PATENT DOCUMENTS

| | | |
|---|---|---|
| JP | 05-008115 | 1/1993 |
| JP | 6-155158 | 6/1994 |

(Continued)

*Primary Examiner* — Sean Michalski
(74) *Attorney, Agent, or Firm* — Greenblum & Bernstein, P.L.C.

(57) ABSTRACT

A method for manufacturing a bandsaw blade provided at the top of the teeth with cutting tips made of a hard material, includes the steps of: offsetting to the left and right saw teeth constituting left and right offset teeth; forming the saw teeth constituting the left and right offset teeth to a smaller tooth height than that of the saw teeth constituting straight teeth; and grinding cutting tips provided to the top of the left and right offset teeth subsequent to the offsetting step, and machining the edge lines at the top of the left and right offset teeth so that the lines are orthogonal to the travel direction of a bandsaw blade and the cutting direction of the bandsaw blade.

3 Claims, 6 Drawing Sheets

(56) References Cited

U.S. PATENT DOCUMENTS

| | | | | |
|---|---|---|---|---|
| 3,295,396 | A | * | 1/1967 | Kolb .................................. 76/25.1 |
| 5,331,876 | A | * | 7/1994 | Hayden, Sr. ...................... 83/661 |
| 5,832,803 | A | * | 11/1998 | Hayden, Sr. ...................... 83/661 |
| 6,220,140 | B1 | * | 4/2001 | Hellebergh ....................... 83/851 |
| 6,257,226 | B1 | * | 7/2001 | Hayden, Sr. ...................... 125/22 |
| 6,269,722 | B1 | * | 8/2001 | Hellbergh ........................ 83/661 |
| 6,439,094 | B1 | * | 8/2002 | Yoneda et al. ................... 83/835 |
| 6,520,722 | B2 | * | 2/2003 | Hopper et al. ................... 407/42 |
| 6,598,509 | B2 | * | 7/2003 | Cook et al. ....................... 83/835 |
| 7,121,180 | B2 | * | 10/2006 | Shimofurutani ................ 83/661 |
| 7,127,979 | B2 | * | 10/2006 | Kocher et al. .................... 83/848 |
| 7,908,954 | B2 | * | 3/2011 | Forsberg et al. ................. 83/661 |
| 8,113,100 | B1 | * | 2/2012 | Cranna et al. .................... 83/851 |
| 8,210,081 | B2 | * | 7/2012 | Elliston et al. ................... 83/835 |
| 2011/0017042 | A1 | * | 1/2011 | Kullmann et al. ............... 83/661 |

FOREIGN PATENT DOCUMENTS

| | | |
|---|---|---|
| JP | 2000-263327 | 9/2000 |
| JP | 2000-317729 | 11/2000 |
| JP | 2001-277043 | 10/2001 |

* cited by examiner

METHOD FOR MANUFACTURING BANDSAW BLADE, AND BANDSAW BLADE

TECHNICAL FIELD

The present invention relates to a method for manufacturing a bandsaw blade and to a bandsaw blade, and more particularly relates to a method for manufacturing a bandsaw blade in which a tooth-end edge line of each of right and left offset teeth is formed in a direction perpendicular to a traveling direction and a cutting direction of the handsaw blade and to a bandsaw blade.

BACKGROUND ART

A bandsaw machine has been conventionally used as a device that cuts a large workpiece made of metal, for example. As a bandsaw blade used in this bandsaw machine, there is frequently used a so-called bimetallic handsaw blade, in which high-speed tool steel or cemented carbide is used as a material for a tooth end of the blade, and high-strength alloy steel (high-stiffness alloy steel) is used as a material for a body portion of the blade.

In a case of a bandsaw blade using high-speed tool steel at its tooth end, it is common to perform a teeth cutting process using a bimetallic raw material, and then perform a teeth offsetting process.

Furthermore, a case of a bandsaw blade using cemented carbide at its tooth end includes an example in which a teeth offsetting process (a bending process) is performed, and an example in which a cemented carbide tip is formed into a dove-tail shape (ginkgo-leaf shape) by a grinding process to provide a clearance corresponding to a teeth offsetting amount without performing the teeth offsetting process.

In a type of a bandsaw blade using cemented carbide at its tooth end and undergoing a teeth offsetting process, it is common to use a raw material referred to as "base metal" formed with a gullet, bond a cemented carbide tip to a portion of the base metal, which constitutes a tooth end, then perform a grinding process to form a side face, a relief face, a rake face, and the like, and then perform the teeth offsetting process.

Patent Literature 1 is a document that is supposed to be relevant to the present invention.

PRIOR ART DOCUMENTS

Patent Document

Patent Document 1: Japanese Patent Application Laid-open No. Hei 06-155158

DISCLOSURE OF THE INVENTION

Technical Problem

Figure 1:
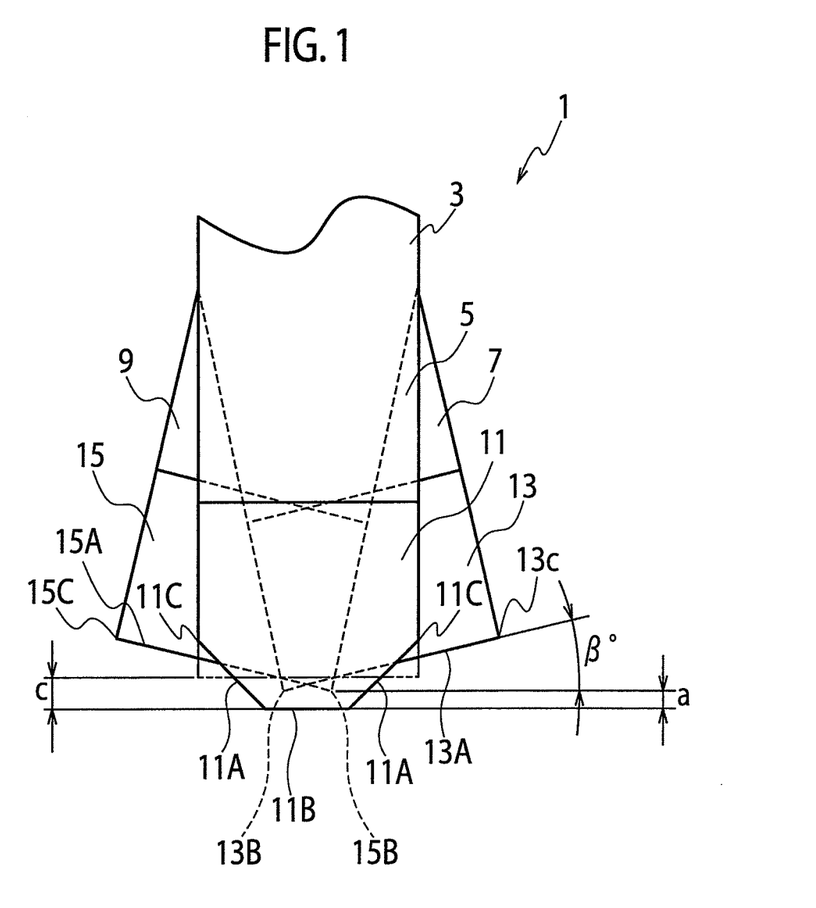
FIG. 1 is an explanatory diagram showing a configuration of a conventional handsaw blade.

A bandsaw blade 1 described in Patent Literature 1 is configured as shown in FIG. 1. That is, the bandsaw blade 1 is configured to include, on one side of a band-shaped body member 3, a straight tooth 5, and a left and right offset teeth 7 and 9 having undergone teeth offsetting processes toward the left and right directions. Cutting tips (tooth-end tips) 11, 13, and 15 that are made of a hard material such as cemented carbide are provided at respective ends of the straight tooth 5 and the right and left offset teeth 7 and 9 in an integral manner by welding or the like.

The tooth-end tip (cutting tip) 11 provided in the straight tooth 5 is formed into a bevel tooth with an inclined surface formed on each of its right and left sides. Tooth-end edge lines 13A and 15A of the tooth-end tips 13 and 15 of the right and left offset teeth 7 and 9 are inclined at an angle β respectively in the right and left directions. As shown in FIG. 1, the tooth-end edge lines 13A and 15A of the tooth-end tips 13 and 15 cross near the top of respective right and left bevel-part edge lines 11A of the tooth-end tip 11 of the straight tooth 5 as viewed from a traveling direction of the bandsaw blade 1. Respective inner corner portions 13B and 15B of the tooth-end tips 13 and 15 are formed smaller by a dimension a relative to a tooth-end edge line 11B of the tooth-end tip 11 of the straight tooth 5. In other words, a tooth-height dimension (a height dimension from the reference position to the tooth-end) of the right and left offset teeth 7 and 9 is smaller than the tooth-height dimension of the straight tooth 5.

Meanwhile, when a teeth offsetting process is performed on the right and left offset teeth 7 and 9, the corner portions 13B and 15B of the right and left offset teeth 7 and 9 approach the tooth-end edge line 11B of the tooth-end tip 11 by the inclination angle β. In some cases, the inner corner portions 13B and 15B of the tooth-end tips 13 and 15 can protrude from the tooth-end edge line 11B of the tooth-end tip 11. Therefore, it is necessary to machine the right and left offset teeth 7 and 9 such that their tooth-height dimension is smaller than that of the straight tooth 5 by a dimension c in advance, before performing the teeth offsetting process on the right and left offset teeth 7 and 9.

As the configuration described above, when the straight tooth 5 is a bevel tooth, it is important that the inner corner portions 13B and 15B of the right and left offset teeth 7 and 9 do not protrude from the tooth-end edge line 11B of the straight tooth 5, as viewed from the traveling direction of the bandsaw blade 1. In a configuration in which the inner corner portions 13B and 15B of the right and left offset teeth 7 and 9 protrude from the tooth-end edge line 11B of the straight tooth 5, the inner corner portions 13B and 15B of the right and left offset teeth 7 and 9 cut into a workpiece prior to the straight tooth 5. Therefore, curved cutting is easily caused by force components applied in the right and left directions on the inner corner portions 13B and 15B.

In the bandsaw blade 1 configured as described above, it is important that the tooth-end edge lines 13A and 15A of the right and left offset teeth 7 and 9 cross the right and left bevel-part edge lines 11A of the straight tooth 5 that is a bevel tooth. That is, in a case of a configuration in which the tooth-end edge lines 13A and 15A of the right and left offset teeth 7 and 9 cross above respective upper ends 11C of the right and left bevel-part edge lines 11A, the bevel tooth that is the straight tooth 5 works more than the right and left offset teeth 7 and 9. Therefore, a cutting groove formed by cutting a workpiece by the bandsaw blade 1 is divided unevenly in the width direction, thereby easily causing curved cutting.

Figure 2:
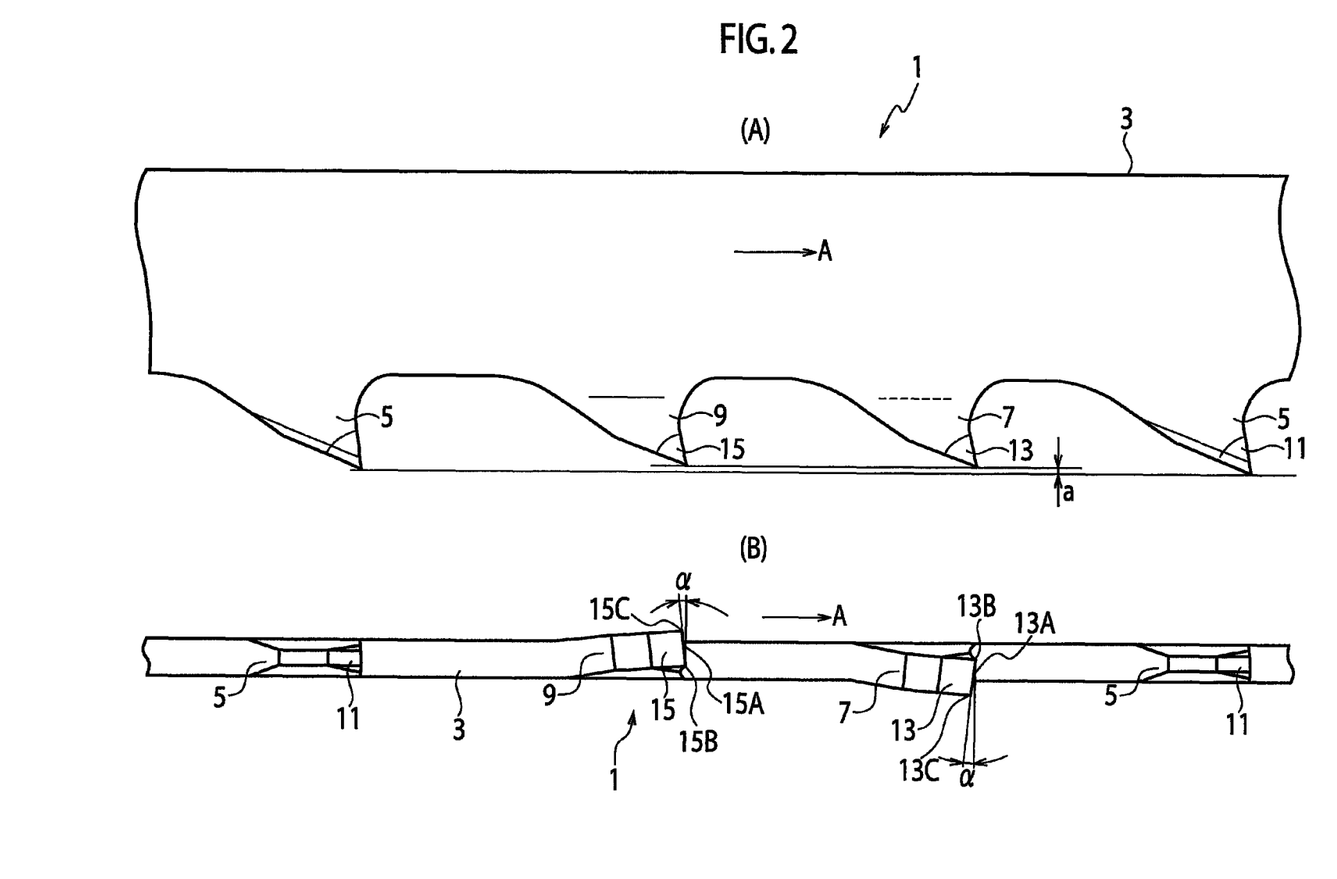
FIGS. 2(A) and 2(B) are explanatory diagrams showing a configuration of the conventional bandsaw blade.

A side view and a bottom view of the bandsaw blade 1 as viewed from the right-left direction and from the tooth-end side are as shown in FIGS. 2(A) and 2(B), respectively. That is, the right and left offset teeth 7 and 9 are formed smaller than the straight tooth 5 by a dimension c in advance, and a height difference a is generated by performing the teeth offsetting process toward the right and the left. Consequently, the tooth-end edge lines 13A and 15A of the right and left offset teeth 7 and 9 are angled at a side rake angle α. That is, the tooth-end edge lines 13A and 15A are inclined such that outer corner portions 13C and 15C are on the rear side (on the left side in FIG. 2(B)) of the inner corner portions 13B and 15B in a traveling direction (an arrow A direction) of the bandsaw blade 1. Therefore, the tooth-end edge lines 13A and 15A of the right and left offset teeth 7 and 9 are inclined at the side rake angle α and a tooth-line inclination angle β.

Figure 3:
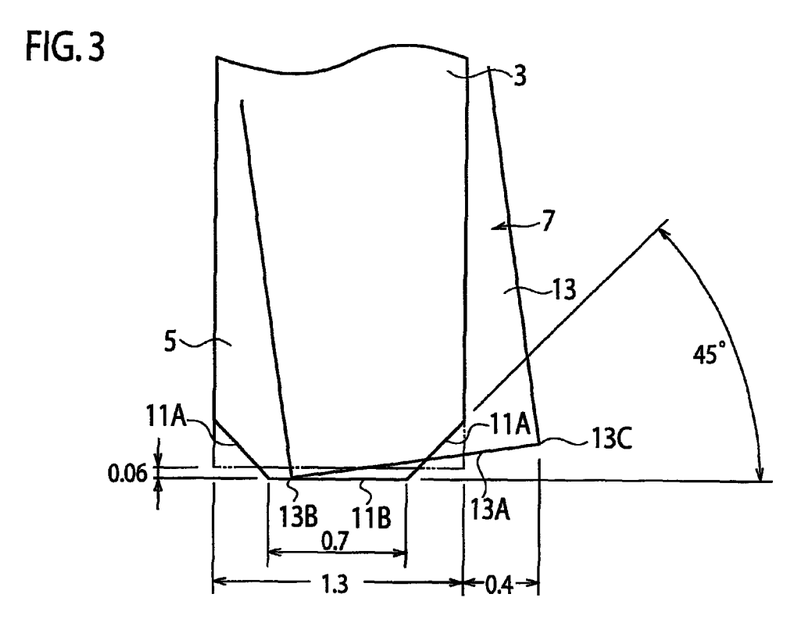
FIG. 3 is an explanatory diagram showing a relationship between a straight tooth and right and left offset teeth in the conventional handsaw blade.

As shown in FIG. 3, when the bandsaw blade 1 is applied to an actual bandsaw blade, assuming that the thickness of the body member 3 is 1.3 mm, the dimension of the tooth-end edge line 11B of the bevel tooth that is the straight tooth 5 is 0.7 mm, the inclination angle of the bevel-part edge line 11A is 45°, and the teeth offsetting amount of the right and left offset teeth 7 and 9 is 0.4 mm, it is necessary to set a difference in tooth-height dimension between the straight tooth 5 and the right and left offset teeth 7 and 9, that is the dimension c, to 0.06 mm before performing the teeth offsetting process in order that the inner corner portion 13B of the right offset tooth 7, for example, does not protrude from the tooth-end edge line 11B of the straight tooth 5.

Figure 4:
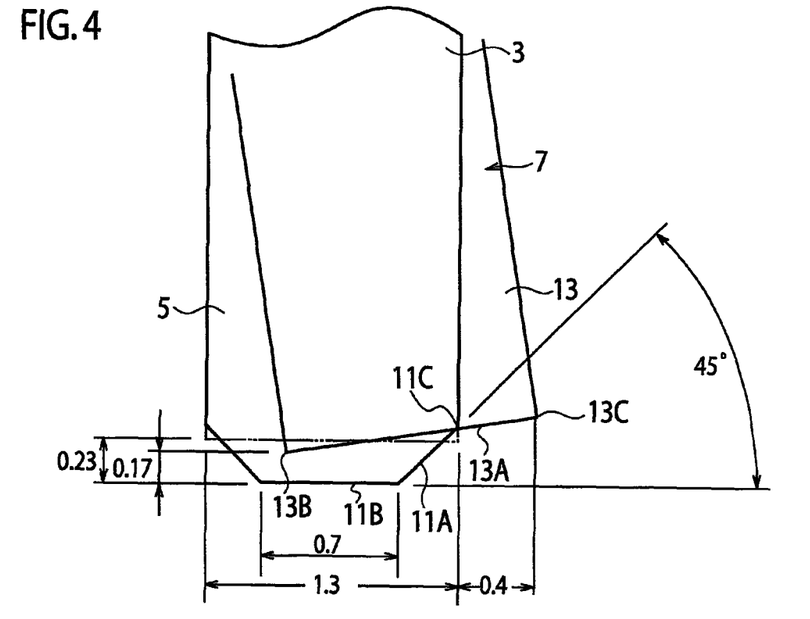
FIG. 4 is an explanatory diagram showing a relationship between the straight tooth and the right and left offset teeth in the conventional handsaw blade.

Next, under the same conditions as described above, it is necessary to set the dimension c to 0.23 mm as shown in FIG. 4, in order that the tooth-end edge lines 13A and 15A of the right and left offset teeth 7 and 9 cross below the respective upper ends 11C of the bevel-part edge lines 11A of the bevel tooth, which is the straight tooth 5. In this case, the dimension a described above is 0.17 mm.

As it is clear from the above explanations, in a case where the bandsaw blade 1 described in Patent Literature 1 is applied to an actual bandsaw blade, it is necessary to set the dimension c described above within a range between 0.06 mm and 0.23 mm. It is desirable that the tooth-end edge lines 13A and 15A of the right and left offset teeth 7 and 9 cross the respective bevel-part edge lines 11A of the straight tooth 5 at a position near a center part of each of the bevel-part edge lines 11A.

Figure 5:
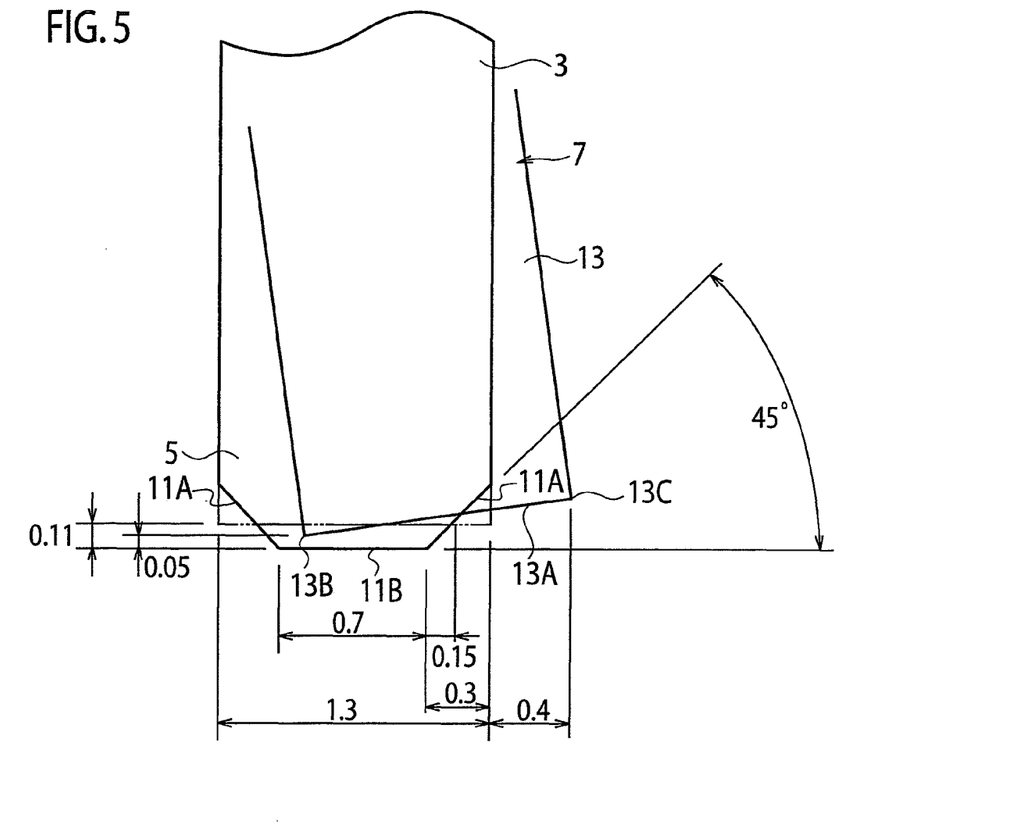
FIG. 5 is an explanatory diagram showing a relationship between the straight tooth and the right and left offset teeth in the conventional handsaw blade.

In this connection, under the same conditions as described above, in a case of a configuration in which the tooth-end edge lines 13A and 15A of the right and left offset teeth 7 and 9 cross near respective center parts of the bevel-part edge lines 11A of the bevel tooth (straight tooth) 5, as shown in FIG. 5, the dimension c is 0.11 mm and the dimension a is 0.05 mm. Therefore, only an allowance of 0.05 mm is left for the straight tooth 5 to be worn in the tooth-height direction by the use of the bandsaw blade 1, and thus the above dimensions are not desirable when the life of the bandsaw blade 1 is taken into consideration.

Figure 6:
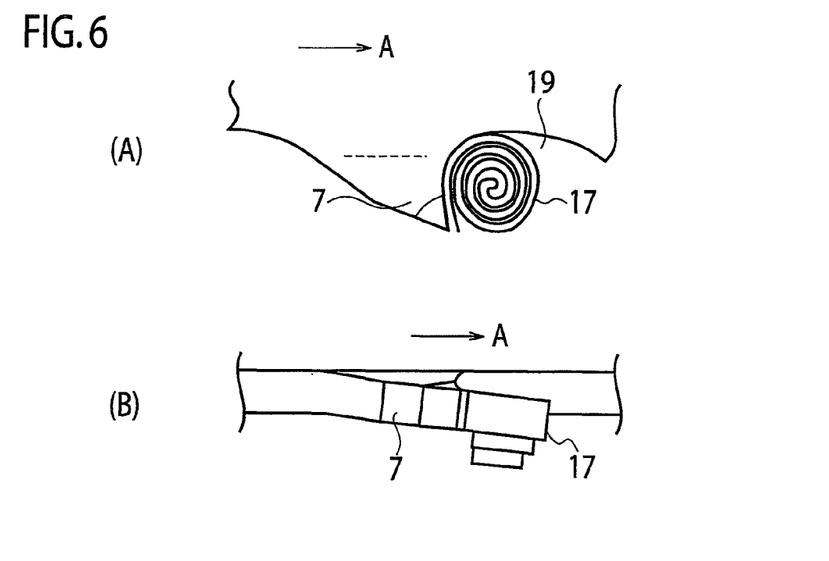
FIGS. 6(A) and 6(B) are explanatory diagrams of a behavior of shavings generated by cutting by the right and left offset teeth in the conventional bandsaw blade.

In the bandsaw blade 1, shavings 17 (see FIG. 6) continuously generated by cutting a workpiece by the right and left offset teeth 7 and 9 tend to be rolled into curls in a gullet 19 on a front side of the right and left offset teeth 7 and 9 in the traveling direction. However, the tooth-end edge lines 13A and 15A of the right and left offset teeth 7 and 9 are inclined by the side rake angle α relative to the traveling direction (the arrow A direction) of the bandsaw blade 1. Therefore, as shown in FIG. 6(B), the shavings 17 tend to protrude in the right-left direction perpendicular to the traveling direction of the bandsaw blade 1.

Accordingly, the shavings 17 slide against a cut surface of the workpiece in a cutting groove formed by cutting the workpiece by the bandsaw blade 1, thereby increasing a cutting resistance and roughening the cut surface.

The present invention has been achieved to solve the above problems. Therefore, a first object of the present invention is to provide a method for manufacturing a bandsaw blade in which a tooth-end edge line of each of right and left offset teeth is easily formed in a direction perpendicular to a traveling direction of the bandsaw blade, and to provide a bandsaw.

A second object of the present invention is to provide a method for manufacturing a bandsaw blade in which a tooth-height dimension of right and left offset teeth can be easily adjusted, and to provide a bandsaw blade.

A third object of the present invention is to provide a method for manufacturing a bandsaw blade in which a tooth-end edge line of each of right and left offset teeth is perpendicular to a traveling direction of the bandsaw blade, and accordingly shavings do not protrude in a lateral direction, and to provide a bandsaw.

Technical Solution

To achieve the above object, a first aspect of the present invention is to provide a method for manufacturing a bandsaw blade having a cutting tip made of a hard material at a tooth end, the method including: (a) a step of performing a process of offsetting saw teeth constituting right and left offset teeth toward right and left; (b) a step of forming saw teeth constituting right and left offset teeth with a smaller tooth-height dimension than a saw tooth constituting a straight tooth; and (c) a step of performing a grinding process on a cutting tip provided at each end of right and left offset teeth subsequent to the teeth offsetting process to machine a tooth-end edge line of each of the right and left offset teeth in a perpendicular form to a traveling direction of a bandsaw blade and a cutting direction of the bandsaw blade.

A second aspect of the present invention is to provide a method for manufacturing a bandsaw blade having a cutting tip made of a hard material at a tooth end, the method including: (a) a step of performing a process of offsetting saw teeth constituting right and left offset teeth toward right and left; (b) a step of performing a grinding process on a relief face of a cutting tip provided at each end of right and left offset teeth subsequent to the teeth offsetting process, wherein a tooth-end edge line of each of the right and left offset teeth is machined so as to be a perpendicular form to a cutting direction of a bandsaw blade after a subsequent step of grinding a rake face; and (c) a step of performing a grinding process on a rake face of the cutting tip after the step of performing a grinding process on a relief face of the cutting tip, wherein the tooth-end edge line of each of the right and left offset teeth is machined in a perpendicular form to a traveling direction and the cutting direction of the bandsaw blade; wherein on the tooth-end edge line of each of the right and left offset teeth, a tooth-height dimension is made smaller than that of a saw tooth constituting a straight tooth when the grinding process is performed on the relief face of the cutting tip provided at each end of the right and left offset teeth having undergone the teeth offsetting process or when the grinding process is performed on the rake face of the cutting tip provided at each end of the right and left offset teeth having undergone the teeth offsetting process.

A third aspect of the present invention is to provide a method for manufacturing a bandsaw blade having a cutting tip made of a hard material at a tooth end, the method including: (a) a step of performing a process of offsetting saw teeth constituting right and left offset teeth toward right and left; (b) a step of performing a grinding process on a rake face of a cutting tip provided at each end of right and left offset teeth subsequent to the teeth offsetting process, wherein a tooth-end edge line of each of the right and left offset teeth is machined to be a perpendicular form to a traveling direction of a bandsaw blade after a subsequent step of grinding a relief face; and (c) a step of performing a grinding process on a relief face of the cutting tip after the step of performing a grinding process on a rake face of the cutting tip, wherein the tooth-end edge line of each of the right and left offset teeth is machined in a perpendicular form to a cutting direction and the traveling direction of the bandsaw blade; wherein on the tooth-end edge line of each of the right and left offset teeth, a tooth-height dimension is made smaller than that of a saw tooth constituting a straight tooth when the grinding process is performed on the relief face of the cutting tip provided at each end of the right and left offset teeth having undergone the teeth offsetting process or when the grinding process is performed on the rake face.

A fourth aspect of the present invention is to provide a bandsaw blade comprising: right and left offset teeth; and a straight tooth; wherein the bandsaw blade further comprises a cutting tip made of a hard material at each end of the teeth; a tooth-height dimension of the straight tooth is provided to be larger than a tooth-height dimension of the right and left offset teeth; and a tooth-end edge line of each of the right and left offset teeth is formed perpendicular to a traveling direction of the bandsaw blade and a cutting direction of the handsaw blade.

In a fifth aspect of the present invention depending on the fourth aspect, in the handsaw blade, the straight tooth is a bevel tooth including an inclined surface on each of both side faces of the cutting tip; and the tooth-end edge line of each of the right and left offset teeth crosses near a center of an inclined bevel-part edge line on each of both sides of the straight tooth, as viewed from a traveling direction of the handsaw blade.

In a sixth aspect of the present invention depending on the fourth aspect or the fifth aspect, in the bandsaw blade, a difference in tooth-height dimension between the straight tooth and the right and left offset teeth is a difference that allows the straight tooth to be worn by use of the bandsaw blade by 0.1 mm or more in a tooth-height direction.

Advantageous Effects

According to the present invention described in the first to sixth aspects, after performing an offsetting process on right and left offset teeth, a grinding process is performed on a tooth-end tip (cutting tip) provided at each end of the right and left offset teeth to machine a tooth-end edge line in a perpendicular form to a traveling direction and a cutting direction of a handsaw blade. Therefore, the tooth-end edge line of each of the right and left offset teeth can be easily formed in a direction perpendicular to the traveling direction of the bandsaw blade, and a tooth-height dimension of the right and left offset teeth can be easily adjusted.

Furthermore, because the tooth-end edge line of each of the right and left offset teeth is perpendicular to the traveling direction of the handsaw blade, shavings do not protrude in the lateral direction, and the conventional problems mentioned above can be solved.

EMBODIMENT FOR CARRYING OUT THE INVENTION

A bandsaw blade according to an embodiment of the present invention is explained below with reference to the drawings. Constituent elements having functions identical to those of the conventional bandsaw blade 1 described above are denoted by like reference numerals and redundant explanations thereof will be omitted.

Figure 7:
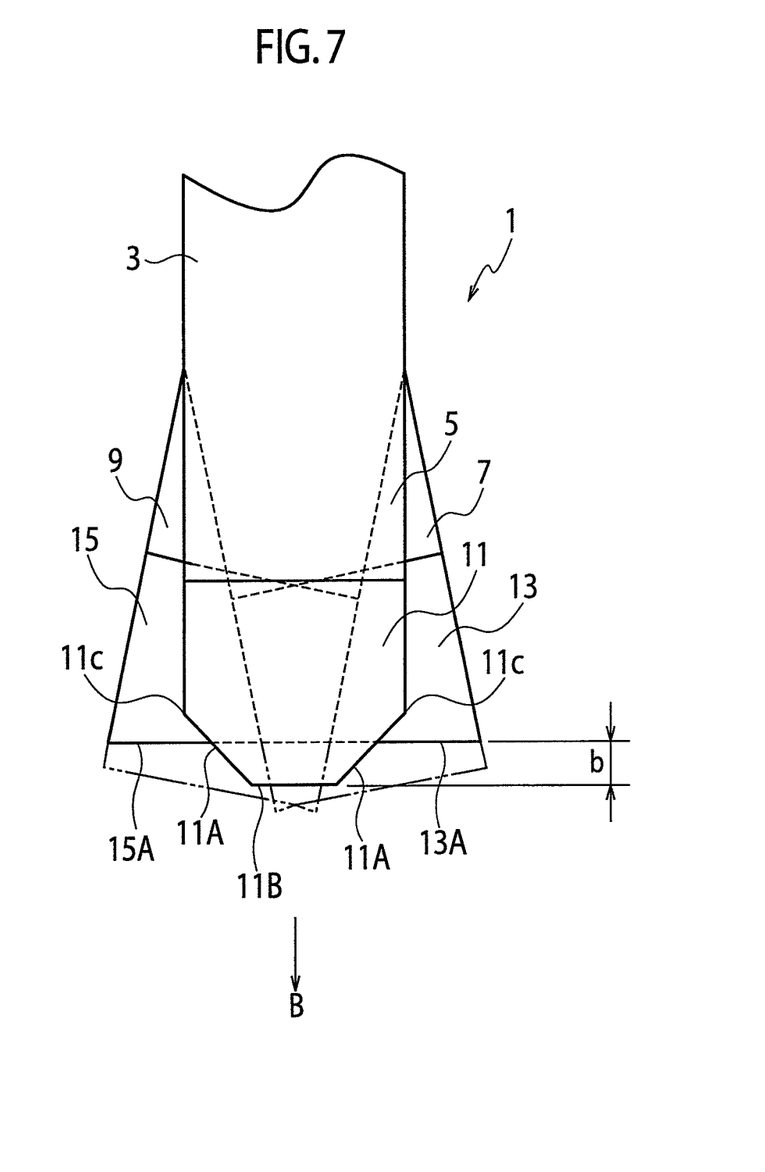
FIG. 7 is an explanatory diagram showing a configuration of a bandsaw blade according to an embodiment of the present invention.

With reference to FIG. 7, a bandsaw blade 1 according to an embodiment of the present invention includes a straight tooth 5, a right offset tooth 7, and a left offset tooth 9 on one side of a body member 3, similarly to the conventional bandsaw blade described above. Tooth-end tips (cutting tips) 11, 13, and 15 made of a hard material such as cemented carbide are provided at respective distal ends of the straight tooth 5 and the right and left offset teeth 7 and 9 in an integral manner by welding or the like, similarly to the conventional bandsaw blade. The straight tooth 5 is formed into a bevel tooth including bevel-part edge lines 11A obtained by forming an inclined surface on each of the right and left sides of the tooth-end tip 11. Because the configuration of the straight tooth (bevel tooth) 5 is identical to that of the conventional technique described above, constituent parts having functions identical to the conventional straight tooth are denoted by like reference numerals and detailed explanations thereof will be omitted.

Figure 8:
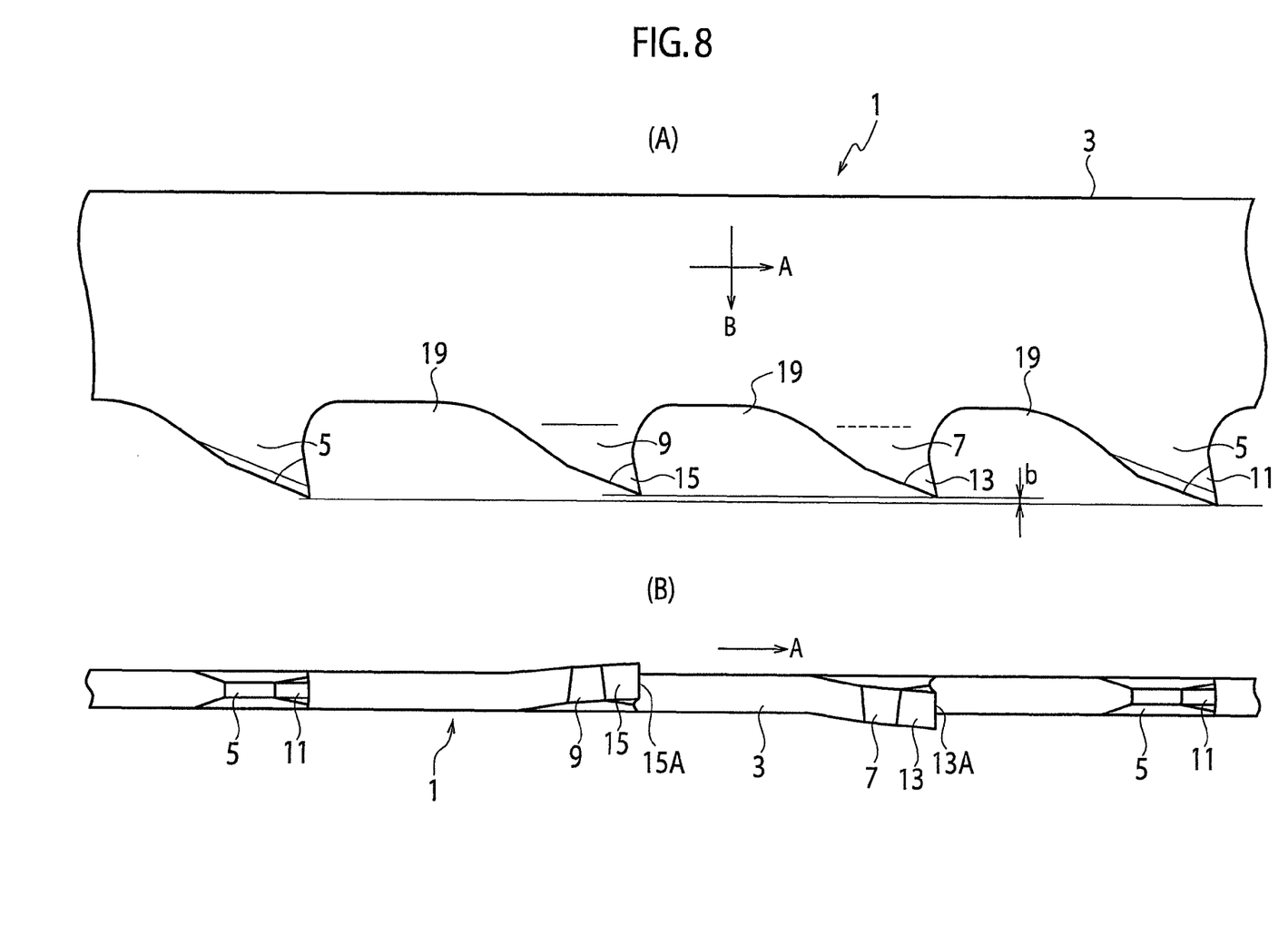
FIGS. 8(A) and 8(B) are explanatory diagrams showing a configuration of the bandsaw blade according to the embodiment of the present invention.

Tooth-end edge lines 13A and 15A of the right and left offset teeth 7 and 9 are perpendicular to a traveling direction (an arrow A direction) of the bandsaw blade 1 as shown in FIG. 8(B), and are also formed in a direction perpendicular to a cutting direction (an arrow B direction) of the bandsaw blade 1 to a workpiece as shown in FIG. 7. The tooth-height dimension of the right and left offset teeth 7 and 9 is smaller than the tooth-height dimension of the straight tooth 5 as shown in FIG. 7. The tooth-end edge lines 13A and 15A of the right and left offset teeth 7 and 9 cross near respective center parts of the bevel-part edge lines 11A of the straight tooth 5, as viewed from the traveling direction of the bandsaw blade 1 in FIG. 7. Therefore, when a workpiece is cut by the bandsaw blade 1, it is possible to evenly distribute a cutting resistance of the straight tooth 5 and the right and left offset teeth 7 and 9, and accordingly stable cutting can be performed.

As described above, the tooth-end edge lines 13A and 15A of the right and left offset teeth 7 and 9 are formed in a direction perpendicular to the traveling direction (the arrow A direction) and the cutting direction (the arrow B direction) of the bandsaw blade 1. Therefore, although shavings continuously generated by cutting a workpiece by the right and left offset teeth 7 and 9 are rolled into curls in a gullet 19, protrusion of the shavings in the right-left direction perpendicular to the traveling direction of the bandsaw blade 1, which has been described in the conventional bandsaw blade, can be suppressed. Accordingly, the conventional problems mentioned above can be solved.

Meanwhile, when the bandsaw blade 1 according to the embodiment of the present invention is manufactured, the straight tooth 5 and the right and left offset teeth 7 and 9 can be formed with the same tooth-height dimension, or the right and left offset teeth 7 and 9 can be formed with a smaller tooth-height dimension than the straight tooth 5 in advance. Subsequently, after performing the teeth offsetting process (bending process) on the right and left offset teeth 7 and 9 relative to the straight tooth 5, a grinding (sharpening) process is performed on the tooth-end tip 11 of the straight tooth 5 and on the tooth-end tips 13 and 15 of the right and left offset teeth 7 and 9.

When the straight tooth 5 and the right and left offset teeth 7 and 9 are formed with the same tooth-height dimension, a process of offsetting saw teeth constituting right and left offset teeth toward the right and the left is performed first. Next, a grinding process is performed on a relief face of a cutting tip provided at each end of the right and left offset teeth having undergone the teeth offsetting process to machine a tooth-end edge line of each of the right and left offset teeth in a perpendicular form to a cutting direction of a bandsaw blade after grinding a rake face. Next, a grinding process is performed on a rake face of the cutting tip provided at each end of the right and left offset teeth having undergone the teeth offsetting process to machine the tooth-end edge line of each of the right and left offset teeth in a perpendicular form to a traveling direction and a cutting direction of the bandsaw blade. On the tooth-end edge line of each of the right and left offset teeth, a tooth-height dimension is made smaller than that of a saw tooth constituting a straight tooth when the grinding process is performed on the relief face of the cutting tip provided at each end of the right and left offset teeth having undergone the teeth offsetting process or when the grinding process is performed on the rake face.

Furthermore, a process of offsetting saw teeth constituting right and left offset teeth toward the right and the left is performed first. Next, a grinding process is performed on a rake face of a cutting tip provided at each end of the right and left offset teeth having undergone the teeth offsetting process to machine a tooth-end edge line of each of the right and left offset teeth in a perpendicular form to a traveling direction of a bandsaw blade after grinding a relief face. Next, a grinding process is performed on a relief face of the cutting tip provided at each end of the right and left offset teeth having undergone the teeth offsetting process to machine the tooth-end edge line of each of the right and left offset teeth in a perpendicular form to a cutting direction and a traveling direction of the bandsaw blade. On the tooth-end edge line of each of the right and left offset teeth, a tooth-height dimension is made smaller than that of a saw tooth constituting a straight tooth when the grinding process is performed on the relief face of the cutting tip provided at each end of the right and left offset teeth having undergone the teeth offsetting process or when the grinding process is performed on the rake face.

When the bandsaw blade is configured as described above, an inclination angle (a bevel angle) of the bevel-part edge lines 11A of the tooth-end tip 11 of the straight tooth 5 relative to a horizontal plane is desirably within a range between 30° and 60°. The bevel angle is more desirably 45°, while taking a balance between forces applied in the right-left lateral direction and in the cutting direction into consideration. The dimension of a tooth-end edge line 11B of the bevel tooth (straight tooth) 5 is preferably within a range between 40% and 70% of the thickness dimension of the body member 3, and is more preferably within a range between 55% and 65% of the thickness dimension, while taking chipping of the bevel tooth 5 on the tooth-end edge line 11B and a cutting resistance applied on the bevel tooth 5 into consideration.

As described above, after performing the offsetting process (the bending process) on the right and left offset teeth 7 and 9, the sharpening process is performed on the tooth-end tips 13 and 15 provided in the right and left offset teeth 7 and 9, respectively. Therefore, the tooth-end edge lines 13A and 15A are easily formed in a perpendicular form to the traveling direction (the arrow A direction) and the cutting direction (the arrow B direction) of the bandsaw blade 1. At this time, the rake face of each of the tooth-end tips 13 and 15 of the right and left offset teeth 7 and 9 is formed into a face parallel to the right-left direction perpendicular to the traveling direction of the bandsaw blade 1. Therefore, shavings continuously generated by cutting do not protrude in the right-left direction.

As is already understood, because the tooth-end tips 13 and 15 of the right and left offset teeth 7 and 9 undergo the sharpening process after the offsetting process, the tooth-height dimension of the right and left offset teeth 7 and 9 can be easily adjusted, and a difference in tooth-height dimension between the straight tooth 5 and the right and left offset teeth 7 and 9 can be set more accurately. That is, the difference in tooth-height dimension can be set to a desirable value. In this case, because the straight tooth 5 has been worn by about 0.1 mm at the end of the life of a bandsaw blade, the difference in tooth-height dimension is desirably equal to or larger than 0.1 mm. In other words, a difference in tooth-height dimension is desirably within a range that allows the straight tooth 5 to be worn by 0.1 mm or more in a tooth-height direction.

The entire contents of Japanese Patent Application No. 2010-179308 (filed on Aug. 10, 2010) are incorporated by reference in the specification of the present application.

The present invention is not limited to the embodiment of the invention explained above and can be embodied in various manners by being properly modified.

The invention claimed is:

1. A method for manufacturing a bandsaw blade including a cutting tip made of a hard material at a tooth end, the method comprising:
   (a) a step of performing a process of offsetting saw teeth constituting right and left offset teeth toward right and left;
   (b) a step of forming saw teeth constituting right and left offset teeth with a smaller tooth-height dimension than a saw tooth constituting a straight tooth; and
   (c) a step of performing a grinding process on a cutting tip provided at each end of right and left offset teeth subsequent to the teeth offsetting process to machine a tooth-end edge line of each of the right and left offset teeth in a perpendicular form to a traveling direction of a bandsaw blade and a cutting direction of the bandsaw blade.

2. A method for manufacturing a bandsaw blade including a cutting tip made of a hard material at a tooth end, the method comprising:
   (a) a step of performing a process of offsetting saw teeth constituting right and left offset teeth toward right and left;
   (b) a step of performing a grinding process on a relief face of a cutting tip provided at each end of right and left offset teeth subsequent to the teeth offsetting process, wherein a tooth-end edge line of each of the right and left offset teeth is machined so as to be a perpendicular form to a cutting direction of a bandsaw blade after a subsequent step of grinding a rake face; and
   (c) a step of performing a grinding process on a rake face of the cutting tip after the step of performing a grinding process on a relief face of the cutting tip, wherein the tooth-end edge line of each of the right and left offset teeth is machined in a perpendicular form to a traveling direction and the cutting direction of the bandsaw blade; wherein on the tooth-end edge line of each of the right and left offset teeth, a tooth-height dimension is made smaller than that of a saw tooth constituting a straight tooth when the grinding process is performed on the relief face of the cutting tip provided at each end of the right and left offset teeth having undergone the teeth offsetting process or when the grinding process is performed on the rake face of the cutting tip provided at each end of the right and left offset teeth having undergone the teeth offsetting process.

3. A method for manufacturing a bandsaw blade including a cutting tip made of a hard material at a tooth end, the method comprising:
(a) a step of performing a process of offsetting saw teeth constituting right and left offset teeth toward right and left;
(b) a step of performing a grinding process on a rake face of a cutting tip provided at each end of right and left offset teeth subsequent to the teeth offsetting process, wherein a tooth-end edge line of each of the right and left offset teeth is machined so as to be a perpendicular form to a traveling direction of a bandsaw blade after a subsequent step of grinding a relief face; and
(c) a step of performing a grinding process on a relief face of the cutting tip after the step of performing a grinding process on a rake face of the cutting tip, wherein the tooth-end edge line of each of the right and left offset teeth is machined in a perpendicular form to a cutting direction and the traveling direction of the bandsaw blade; wherein on the tooth-end edge line of each of the right and left offset teeth, a tooth-height dimension is made smaller than that of a saw tooth constituting a straight tooth when the grinding process is performed on the relief face of the cutting tip provided at each end of the right and left offset teeth having undergone the teeth offsetting process or when the grinding process is performed on the rake face of the cutting tip provided at each end of the right and left offset teeth having undergone the teeth offsetting process.

* * * * *

UNITED STATES PATENT AND TRADEMARK OFFICE
CERTIFICATE OF CORRECTION

| | | |
|---|---|---|
| PATENT NO. | : 9,038,512 B2 | Page 1 of 1 |
| APPLICATION NO. | : 13/814520 | |
| DATED | : May 26, 2015 | |
| INVENTOR(S) | : Horiguchi et al. | |

It is certified that error appears in the above-identified patent and that said Letters Patent is hereby corrected as shown below:

On the Title Page, (73) Assignee, please change "Amanda" to --Amada-- for both Assignees listed.

Signed and Sealed this
First Day of March, 2016

Michelle K. Lee
*Director of the United States Patent and Trademark Office*